(12) United States Patent
Kordel et al.

(10) Patent No.: US 7,078,635 B2
(45) Date of Patent: Jul. 18, 2006

(54) HOUSING WITH CONDUCTOR BUS FOR A DISCONNECTING APPARATUS

(75) Inventors: Gerhard Kordel, Nuremberg (DE); Jurgen Knauss, Obermichelbach (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/815,702

(22) Filed: Apr. 2, 2004

(65) Prior Publication Data
US 2005/0023116 A1 Feb. 3, 2005

(30) Foreign Application Priority Data
Apr. 3, 2003 (DE) ................................. 103 15 368
Apr. 11, 2003 (DE) ....................... 10 2004 011 863

(51) Int. Cl.
*H01H 85/00* (2006.01)
(52) U.S. Cl. ..................................... 200/61.08; 337/157
(58) Field of Classification Search ............. 200/61.08, 200/151, 306; 337/157–159, 401–409; 89/1.14; 264/84; 137/68.13; 83/639.4
See application file for complete search history.

(56) References Cited

U.S. PATENT DOCUMENTS

| 3,715,697 | A | * | 2/1973 | Them ........................... 337/157 |
| 3,794,794 | A | * | 2/1974 | Provancher ............... 200/61.53 |
| 4,224,487 | A | | 9/1980 | Simonsen |
| 4,417,519 | A | * | 11/1983 | Lutz ......................... 200/61.08 |
| 5,535,842 | A | * | 7/1996 | Richter et al. ........... 200/61.08 |
| 5,877,563 | A | * | 3/1999 | Krappel et al. .......... 200/61.08 |

FOREIGN PATENT DOCUMENTS

| DE | 3934048 | 4/1991 |
| DE | 4413847 | 11/1994 |
| DE | 29614976 | 1/1997 |
| DE | 29700594 | 4/1997 |
| DE | 19616993 | 10/1997 |
| DE | 19616994 | 10/1997 |
| DE | 19705242 | 8/1998 |

(Continued)

OTHER PUBLICATIONS

Patent Abstracts of Japan, Pub. No. 2000123695, Appln. No. 10293233, filed Oct. 1998.

*Primary Examiner*—Elvin Enad
*Assistant Examiner*—M. Fishman
(74) *Attorney, Agent, or Firm*—Scott A. McBain

(57) ABSTRACT

A pyromechanical disconnecting apparatus, in particular for battery shutoff in a motor vehicle, includes a housing (4) in which there is arranged an electrically conductive conductor bus (2), which is fashioned so as to be severable at a predetermined cut position (1) by a cutting chisel (6) driven by a pyrotechnic propellant charge. The conductor bus (2) is clamped in on its side facing away from the cutting chisel (6) by a locking bolt (5) inserted into the housing (4), and a receiving space (15) is arranged in the locking bolt (5) in the region of the predetermined cut position (1), into which receiving space the cutting chisel (6) bends the region of the conductor bus (2) severed by it, and the locking bolt (5) forms an external surface of the housing (4). In order to diminish cracking of the locking bolt and housing and for purposes of inspection to determine whether the disconnecting apparatus has tripped, it is proposed that a recess (13) be arranged in the locking bolt (5), which recess transpicuously connects the receiving space (15) with the atmosphere.

10 Claims, 1 Drawing Sheet

FOREIGN PATENT DOCUMENTS

| | | |
|---|---|---|
| DE | 19732650 | 2/1999 |
| DE | 19901637 | 7/1999 |

* cited by examiner

HOUSING WITH CONDUCTOR BUS FOR A DISCONNECTING APPARATUS

BACKGROUND OF THE INVENTION

This invention relates to a pyromechanical disconnecting apparatus, in particular for battery shutoff in a motor vehicle, having a housing in which there is arranged an electrically conductive conductor bus, which is fashioned so as to be severable at a predetermined cut position by a cutting chisel driven by a pyrotechnic propellant charge, the conductor bus is clamped in on its side facing away from the cutting chisel by a locking bolt inserted into the housing, and a receiving space is arranged in the locking bolt in the region of the predetermined cut position, into which receiving space the cutting chisel bends the region of the conductor bus severed by it, and the locking bolt forms an external surface of the housing.

Such a pyromechanical disconnecting apparatus is shown by DE 103 37 958 A1.

By reason of mechanical stressing/loading during the disconnection process, it is impossible to rule out cracking of the locking bolt and housing, which can be compensated only by thicker walls of the individual components. This is generally associated with costs and is disadvantageous in that the component volume is increased and thus employment may be restricted.

What is more, it is not easy to check whether the disconnecting apparatus has tripped, that is, a severance of the conductor bus has taken place.

BRIEF SUMMARY OF THE INVENTION

According to the invention these disadvantages are remedied by providing a recess in the locking bolt, the recess transpicuously connecting the receiving space with the atmosphere.

Because a recess is arranged in the locking bolt, which recess transpicuously connects the receiving space with the atmosphere, stresses that act on the locking bolt and the housing during the disconnection process are diminished so that cracking is prevented or at least the danger of cracking is reduced.

What is more, the recess, which transpicuously connects the receiving space with the atmosphere, enables the operator to determine easily whether a severance of the conductor bus has taken place or whether the disconnecting apparatus has tripped.

In a preferred embodiment according to the invention, the recess is a hole.

The recess or hole is advantageously covered by a transparent material. This has the advantage of preventing foreign bodies (dust, chips) penetrating into the receiving space via the recess. Further, the ionization spark arising during the disconnection process is encapsulated and the danger of spontaneous ignition of substances capable of being ignited by electric sparks is prevented.

In order that the transparent material be transpicuous, the transparent material is preferably a transparent plastic or a transparent glass.

DETAILED DESCRIPTION OF THE INVENTION

Figure 1:
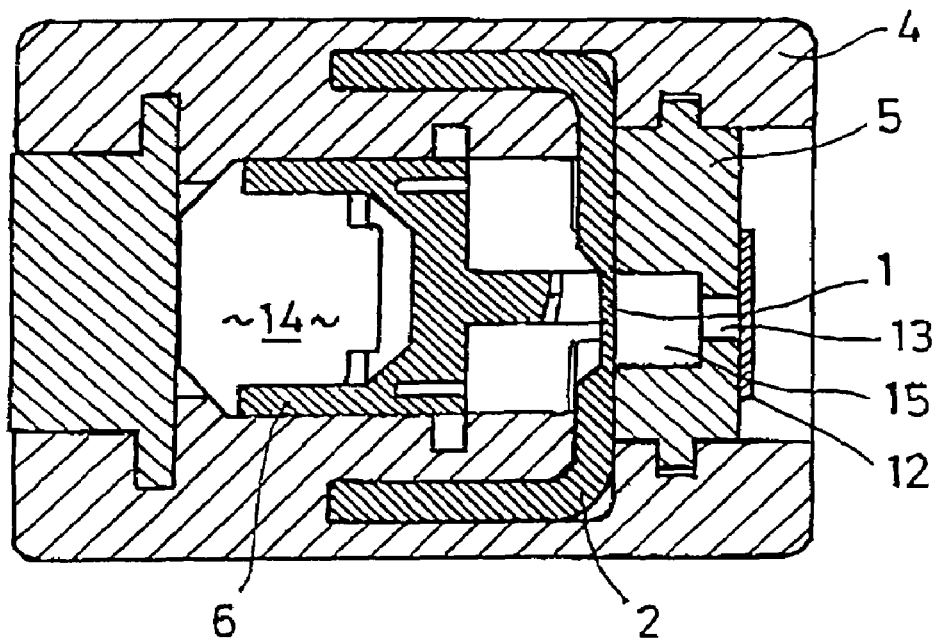
FIG. 1 is a cross-sectional view of the disconnecting apparatus of the invention.

Further features are shown in the drawings, which are described in what follows.

Figure 2:
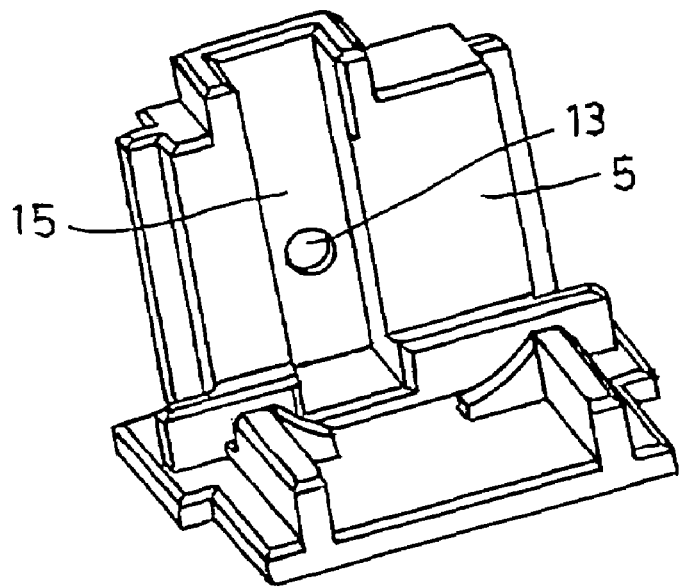
FIG. 2 is a perspective view of the locking bolt.

FIG. 1 shows a housing 4 of a disconnecting apparatus, in which a conductor bus 2 is arranged. Arranged in axially displaceable fashion in housing 4 is a cutting chisel 6, which is movable by a firing element 14 or its pyrotechnic charge (propellant gas) in the direction of bus 2. For the axial fixation of conductor bus 2 in housing 4, conductor bus 2 is restrained by a locking bolt 5 (see also FIG. 2). Let into this locking bolt 5 is a receiving space 15, which adjoins predetermined cut position 1 of conductor bus 2 and is arranged on the side of conductor bus 2 opposite to cutting chisel 6, so that receiving space 15 is located between bus 2 and locking bolt 5. On firing of firing element 14, cutting chisel 6 is accelerated toward conductor bus 2 and severs conductor bus 2 at predetermined cut position 1 by a bending process. The bent-over part of bus 2 is here bent over into receiving space 15.

According to the invention, an aperture 13 in the shape of a hole is arranged in locking bolt 5, which aperture transpicuously connects receiving space 15 with the atmosphere. Thus an operator can easily ascertain whether the disconnecting apparatus has tripped.

Aperture 13 is covered with a transparent material 12. This material 12 can be a plastic or glass.

The disconnecting apparatus according to the invention is particularly well-suited to battery shutoff in a motor vehicle.

The invention claimed is:

1. A pyromechanical disconnecting apparatus, having a housing in which there is arranged an electrically conductive conductor bus, which is fashioned so as to be severable at a predetermined cut position by a cutting chisel driven by a pyrotechnic propellant charge, the conductor bus is clamped in on its side facing away from the cutting chisel by a locking bolt inserted into the housing, and a receiving space is arranged in the locking bolt in the region of the predetermined cut position, into which receiving space the cutting chisel bends the region of the conductor bus severed by it, and the locking bolt forms an external surface of the housing, wherein a recess is arranged in the locking bolt, which recess transpicuously connects the receiving space with the atmosphere.

2. The disconnecting apparatus of claim 1 wherein the recess is a hole.

3. The disconnecting apparatus of claim 1 wherein the recess is covered by a transparent material.

4. The disconnecting apparatus of claim 3 wherein the transparent material is a transparent plastic or a transparent glass.

5. The disconnecting apparatus of claim 1, wherein the recess has a smaller cross-sectional area than the receiving space.

6. A battery shut off in a motor vehicle comprising a disconnecting apparatus having a housing in which there is arranged an electrically conductive conductor bus, which is fashioned so as to be severable at a predetermined cut position by a cutting chisel driven by a pyrotechnic propellant charge, the conductor bus is clamped in on its side facing away from the cutting chisel by a locking bolt inserted into the housing, and a receiving space is arranged in the locking bolt in the region of the predetermined cut position, into which receiving space the cutting chisel bends the region of the conductor bus severed by it, and the locking bolt forms an external surface of the housing, wherein a recess is arranged in the locking bolt, which recess transpicuously connects the receiving space with the atmosphere.

7. The battery shut off of claim 6 wherein the recess is a hole.

8. The battery shut off of claim 6 wherein the recess is covered by a transparent material.

9. The battery shut off of claim 8 wherein the transparent material is a transparent plastic or a transparent glass.

10. The battery shut off of claim 6, wherein the recess has a smaller cross-sectional area than the receiving space.

* * * * *